W. GLUCK.
Coal Sifter.
No. 98,583.  Patented Jan. 4, 1870
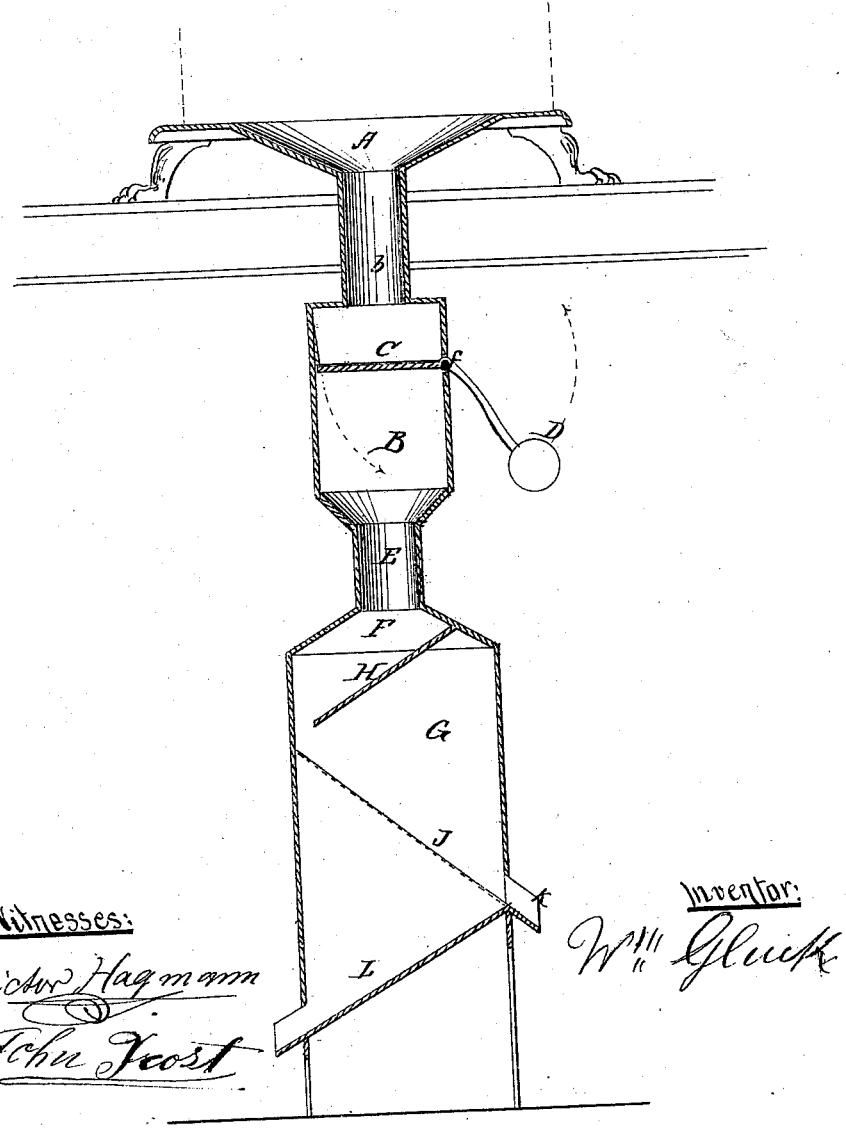

United States Patent Office.

WILLIAM GLUCK, OF BALTIMORE, MARYLAND.

Letters Patent No. 98,583, dated January 4, 1870.

IMPROVED AUTOMATIC COAL-SIFTER.

The Schedule referred to in these Letters Patent and making part of the same

To all whom it may concern:

I, WILLIAM GLUCK, of Baltimore, in the State of Maryland, have invented certain Improvements in Coal-Sifters, of which the following is a specification.

*Description of the Accompanying Drawing.*

Figure 1 is a plan view.

*Nature and Objects of the Invention.*

My invention relates to a coal-sifter which is designed as an adjunct of such stoves and furnaces as consume coals for fuel.

It is automatic in its operation, and its object is to provide a means of sifting cinders, and separating the coals from the ashes thereof, without the usual labor and dust attendant upon the operation, whereby an extremely economical and labor-saving device is obtained for the purpose aforesaid.

It consists in the method of construction, and also in the method of attaching an automatic coal-sifter to the base of a stove or furnace, which coal-sifter extends therefrom into the basement of the cellar of the house wherein it is located.

It also consists in providing said device with a trap, so operated by a weighted lever as to immediately close, upon the passage of the cinders aforesaid, in order thereby to prevent the ascent of the dust or ashes arising from the sifting cinders.

A is the base-plate of the stove or furnace, whereon the ashes or cinders are precipitated in the usual manner. It may be formed of one or two horizontal plates, slightly inclining toward the centre, but when made of two, it may be cast hollow, and connected together at the extremities and centre thereof.

It is provided, at its centre, with a suitable pipe or conduit, *a*, leading into the pipe *b*, of the trap-box B.

The pipe *a*, attached to the base-plate A, connects or links with the pipe *b*, of the trap-box B.

C is the platform of a trap, the device being pivoted to the side of the trap-box B at *f*, and is operated by means of the weighted lever D, which connects therewith, the weighted end projecting horizontally therefrom, and the weight thereof being so arranged, as to quantity, as to be easily elevated by the cinders falling on the platform aforesaid.

The trap is opened by the weight of the falling cinders, but is automatically closed by the weight or lever D, immediately after said cinders have descended beneath the same.

E is a conduit, attached to the bottom of the trap-box B, and connecting or linking with the pipe F, of the sieve G.

G is a sieve, provided with the incline H, on which fall the cinders from the trap-box B, and from the said incline, which is made at an angle of about forty-five degrees, the cinders are precipitated upon the sieve or screen J.

J is a screen, upon which the cinders fall from the incline H, and then progress in their descent its entire length, the coal, thus separated from the ashes, passing out at the spout K, while the ashes, precipitated upon the incline L, take the opposite direction.

*Claim.*

What I claim as my improvement in coal-sifters, is—

The trap-box B, platform C, and lever D, with its weight, in combination with the base-plate A and screen G, as shown and described.

WM. GLUCK.

Witnesses:
VICTOR HAGMANN,
JOHN FROST.